United States Patent
Liang

(10) Patent No.: US 7,527,474 B1
(45) Date of Patent: May 5, 2009

(54) TURBINE AIRFOIL WITH MINI-SERPENTINE COOLING PASSAGES

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 405 days.

(21) Appl. No.: 11/503,549

(22) Filed: Aug. 11, 2006

(51) Int. Cl.
F01D 5/18 (2006.01)

(52) U.S. Cl. .......................... 416/1; 416/97 R

(58) Field of Classification Search .............. 415/115; 416/96 R, 97 R, 1; 29/889.2
See application file for complete search history.

(56) References Cited

U.S. PATENT DOCUMENTS

| 5,626,462 | A  | * | 5/1997 | Jackson et al. | ......... | 416/97 R |
| 6,247,896 | B1 | * | 6/2001 | Auxier et al. | ........... | 416/97 R |
| 6,264,428 | B1 | * | 7/2001 | Dailey et al. | ............ | 416/97 R |
| 6,280,140 | B1 |   | 8/2001 | Soechting et al. | | |
| 6,379,118 | B2 | * | 4/2002 | Lutum et al. | ............... | 416/97 R |
| 6,705,831 | B2 |   | 3/2004 | Draper | | |
| 6,705,836 | B2 | * | 3/2004 | Bourriaud et al. | ........ | 416/97 R |

\* cited by examiner

Primary Examiner—Ninh H Nguyen
(74) Attorney, Agent, or Firm—John Ryznic

(57) ABSTRACT

An airfoil used in a gas turbine engine, especially a large rotor blade in an industrial gas turbine engine, the airfoil having at least one cooling air supply cavity formed by an inner wall of the airfoil to supply cooling air to the airfoil, and a plurality of mini-serpentine cooling modules formed between the inner wall and the outer wall surface of the airfoil providing near-wall cooling for the airfoil. The modules includes three-pass or five-pass serpentine cooling channels with an inlet in fluid communication with the cooling air supply cavity and an outlet opening onto the airfoil surface to provide film cooling to the airfoil. The length of a straight section of the passage is about 5 to 10 mm and about 1 mm in diameter. A plurality of supply cavities are formed within the inner wall and separated by ribs. A plurality of mini-serpentine cooling modules is arranged along a chordwise length of the airfoil and each is in fluid communication with the nearest supply cavity.

24 Claims, 3 Drawing Sheets

Fig 2
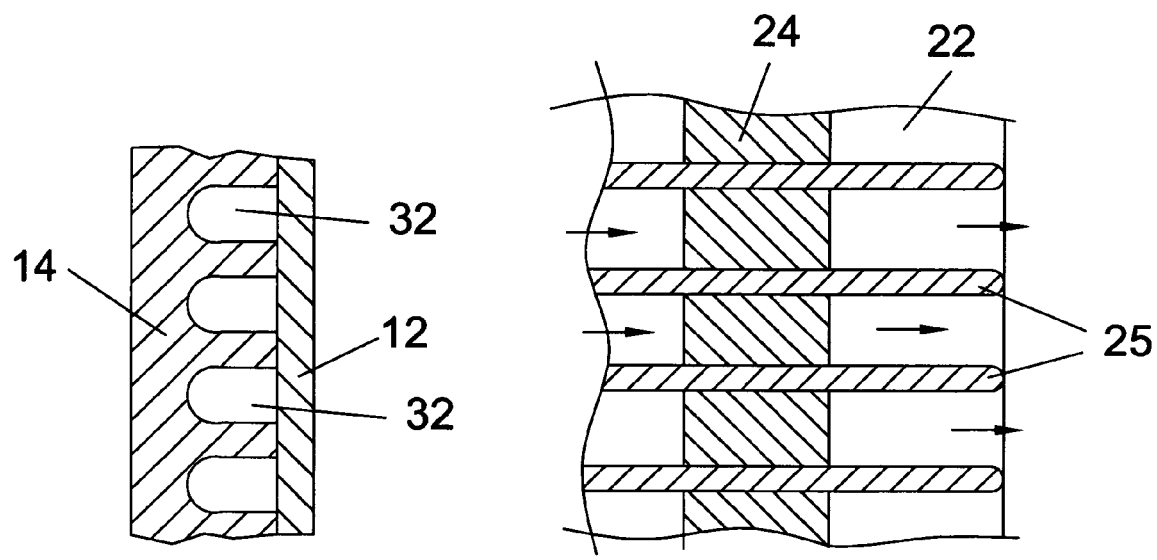
Fig 3
Fig 4

TURBINE AIRFOIL WITH MINI-SERPENTINE COOLING PASSAGES

BACKGROUND OF THE INVENTION

1. Field of the Invention

The present invention relates to fluid reaction surfaces, and more specifically to turbine airfoils with internal cooling passages.

2. Description of the Related Art Including Information Disclosed Under 37 CFR 1.97 and 1.98

A gas turbine engine burns a fuel to produce a hot gas flow which is passed through a turbine to produce mechanical work. A compressor delivers compressed air to a combustor to be mixed with a fuel to burn. The resulting hot gas flow is directed through a multiple stage turbine to convert the hot gas flow into rotation of the turbine to drive the compressor. In an Industrial Gas Turbine (IGT), the turbine shaft is also used to drive a motor such as an electrical generator. In an aero gas turbine engine, the exhaust is used to propel the airplane.

An efficiency of the gas turbine engine can be improved by operating at a higher hot gas flow temperature. However, the highest temperature in the turbine is limited to the material properties of the first stage vane and turbine blade since these are the firsts parts that the hot gas flow contacts. To allow for higher temperatures, internal cooling passages are provided within the first and second stages of the vanes and blades of the turbine. Various configurations have been proposed in order to minimize the cooling air used through the airfoils while providing for the maximum cooling effect. A multiple pass serpentine cooling flow circuit has been proposed in the past that provides improvements in both cooling air volume and cooling effectiveness.

Prior Art near wall cooling utilized in an airfoil main body is constructed with a single pass radial flow channel plus re-supply holes in conjunction with film discharge cooling holes. As a result of this cooling construction approach, spanwise and chordwise cooling flow control due to airfoil external hot gas temperature and pressure variation is difficult to achieve. In addition, a single radial channel flow is not the best method of utilizing cooling air that results in low convective cooling effectiveness.

U.S. Pat. No. 6,247,896 B1 issued to Auxier et al on Jun. 19, 2001 entitled METHOD AND APPARATUS FOR COOLING AN AIRFOIL discloses a rotor blade or stator vane for a gas turbine engine that has a plurality of micro-serpentine cooling passages formed in a wall of the airfoil and an airfoil surface formed over the passages. These passages are micro-circuits of very small diameters. Auxier et al discloses that each micro-circuit can occupy a wall surface area as great as 0.1 square inches (64.5 mm$^2$) and with a cross sectional area of the passage segment less than 0.001 square inches (0.6 mm$^2$). The size of these micro-circuits is so small that this invention cannot be used to cool a large blade or vane such as one used in an industrial gas turbine or IGT. The micro-circuits of the Auxier et al patent cannot provide enough cooling air flow through the passages to come near to adequately cooling the airfoil. Also, the micro-circuits of the Auxier et al patent would be very costly to make, since thousands of these tiny circuits would be needed for just one surface of the airfoil. In FIG. 3 of the Auxier et al patent, the passages appear to start from the top and flow toward the bottom due to the orientation of the Figure.

It is an object of the present invention to reduce an airfoil metal temperature of a gas turbine engine while also reducing the cooling flow requirements in order to improve turbine efficiency.

It is another object of the present invention to provide reduced airfoil metal temperature and reduced cooling flow for a large gas turbine airfoil such as one used in an industrial gas turbine engine.

BRIEF SUMMARY OF THE INVENTION

The present invention is a turbine airfoil having a plurality of small modules each having a mini-serpentine cooling flow passage to provide near wall chordwise cooling of the airfoil wall. The airfoil includes an outer airfoil surface and an inner wall having three radially oriented cooling passages therein. Positioned between the outer airfoil surface and the inner wall surface are the mini-serpentine modules. Each module can be a three pass or five pass serpentine passage with an inlet connected to one of the internal radial cooling passages and an outlet connected to a film cooling holes opening onto the outer airfoil surface to provide film cooling. The mini-serpentine modules are formed within the outside surface of the inner wall of the airfoil and extend along in the chordwise direction of the airfoil. The individual modules are designed based on the airfoil gas side pressure distribution in both the chordwise and the spanwise directions. In addition, each individual module can be designed based on the airfoil local external heat load to achieve a desired local metal temperature. The mini-serpentine module can be designed as a five-pass or a triple-pass (three-pass) serpentine circuit in counter or parallel flow serpentine network. These individual small modules can be constructed in a staggered or inline array along the airfoil main body wall. With the unique cooling construction of the present invention, maximize usage of the cooling air for a given airfoil inlet gas temperature and pressure profile is achieved. In addition, the multi-pass of cooling air in the serpentine channels yields a higher internal convection cooing effectiveness than the single pass radial flow channel used in the prior art near wall cooling design. The modules are large enough to provide adequate cooling air flow to cool a large airfoil such as that used in an industrial gas turbine engine (IGT) while being practical in the manufacture of the airfoil.

BRIEF DESCRIPTION OF THE SEVERAL VIEWS OF THE DRAWINGS

FIG. 2 shows two of the mini-serpentine flow passages used in the present invention.

FIG. 3 shows a cut-away view of a section of the airfoil with the inner wall and the outer airfoil surface with the mini-serpentine flow passages.

FIG. 4 shows cut-away view of the trailing edge cooling flow passages in the airfoil.

DETAILED DESCRIPTION OF THE INVENTION

Figure 1:
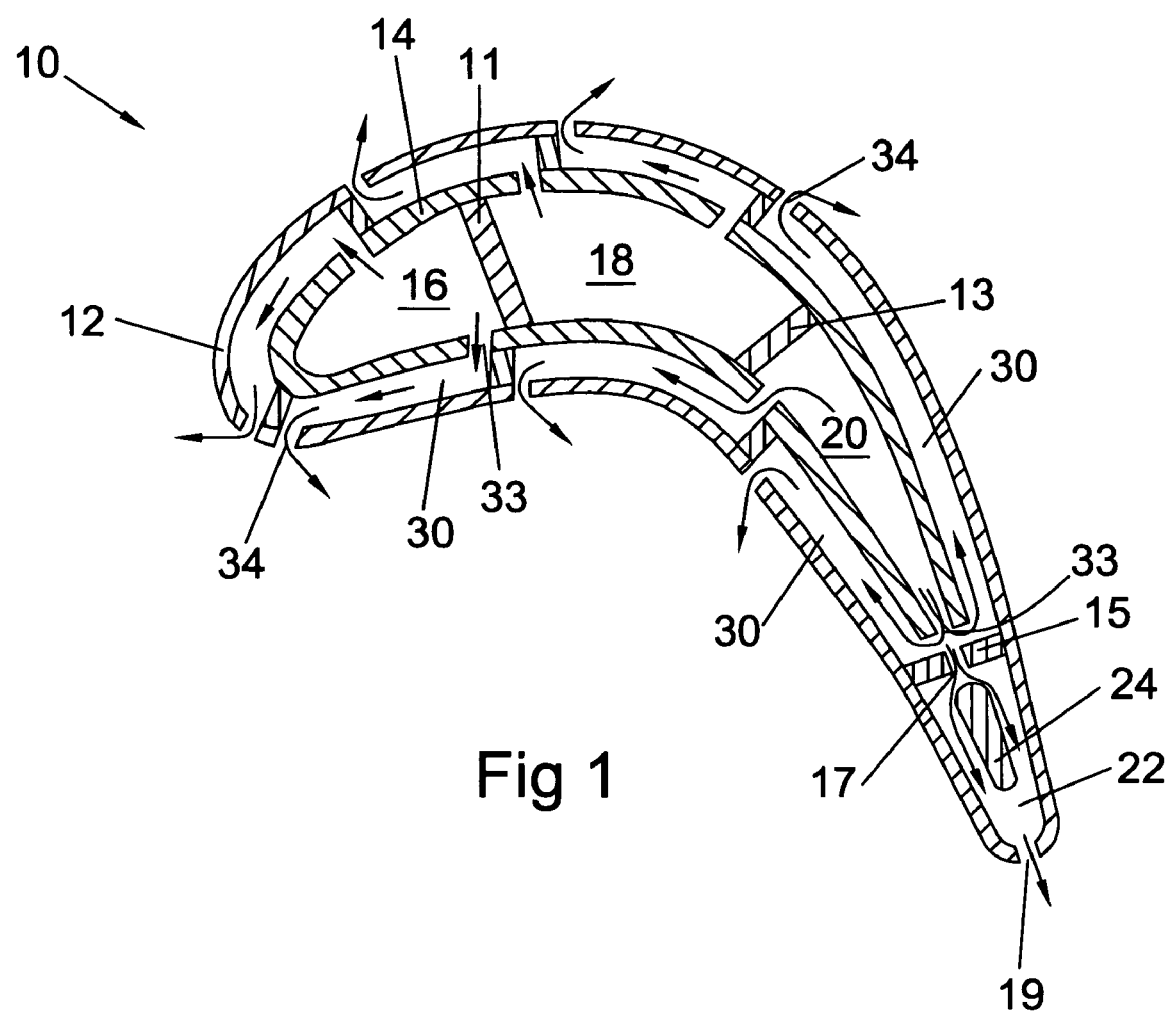
FIG. 1 shows a cross section view of the airfoil.

The present invention is an airfoil used in a gas turbine engine, the airfoil having an internal cooling flow passage to provide cooling to the airfoil that operates under extreme high temperatures that would normally damage the airfoil without the cooling. The airfoil can be a stationary vane or nozzle in the first or second stage, or a first or second stage rotary blade used in the turbine. A cross section of the airfoil 10 is shown in FIG. 1. An outer airfoil surface 12 forms the general airfoil surface on which the hot gas flow acts thereon. An inner wall airfoil surface 14 is positioned within the outer airfoil surface 12 and includes three radial cooling channels. A leading edge radial cavity 16 provides cooling air to the leading edge portion of the airfoil, a middle radial cooling cavity 18 provides cooling air to the middle portion of the airfoil, and a trailing edge or mid-chord radial cooling cavity 20 provides cooling air to the trailing edge portion of the airfoil. Internal ribs 11, 13 and 15 provide support for the inner wall 14 of the airfoil and separate the internal radial cooling cavities from each other. The embodiment of the present invention shown in FIG. 1 shows three radial cooling cavities. However, more or less radial cavities can be used depending upon the design requirements for the airfoil.

The shape of the serpentine channel 32 shown in FIG. 3 allows for the external wall 12 of the airfoil to be bonded or spread onto the inner wall surface 14. Therefore, the external wall 12 can be made very thin. The inner wall 14 and the ribs 11, 13, and 15 to form the cavities 16, 18, 20, and 22 can be cast. Because of the flat portions formed between channels 32 in FIG. 3, the external wall 12 could even be formed by PVD or physical vapor deposition if a ceramic material was used to fill the channels 32 and bleached out when the external wall 12 was formed thereon.

A plurality of mini-serpentine cooling flow modules 30 are located between the outer airfoil surface 12 and the inner wall 14 of the airfoil. FIG. 1 shows several of these mini-serpentine modules 30, one of which is located on the pressure side of the airfoil and at the leading edge side having an inlet 33 connected to the leading edge radial cavity 16 and an outlet 34 to discharge cooling air onto the outer surface of the airfoil. The cooling air flow path for this example shown in FIG. 1 appears to have a straight path from the inlet 33 to the outlet 34 of the mini-serpentine flow passage 30. However, the flow path actually follows the three-pass serpentine path shown in FIG. 2. Cooling air enters the serpentine passage 30 at the inlet 33, flows along the first leg of the serpentine passage and reverses direction, flows into the second leg in a reverse direction from the first leg, and then reverses again into the third leg of the serpentine passage, and then out the exit 34 and onto the airfoil outer surface. The inlet 33 of FIG. 2 will bend toward the inner wall of the airfoil and be substantially flush with the inner wall surface. The outlet 34 of the serpentine passage 30 will also bend out toward the outer wall surface and be flush with the outer airfoil surface 12. The mini-serpentine passage can be a five-pass serpentine flow circuit if desired by providing for the fourth and fifth legs of the serpentine passage. The airfoil can have all three-pass serpentine passages, or all five-pass serpentine passages, or a mixture of both on the airfoil, depending upon the cooling requirements for the airfoil. The diameter of the holes 33 and 34 in the serpentine passage 30 are about 1 mm, while the length of the straight sections of the passage is about 5 to 10 mm in length.

Figure 5:
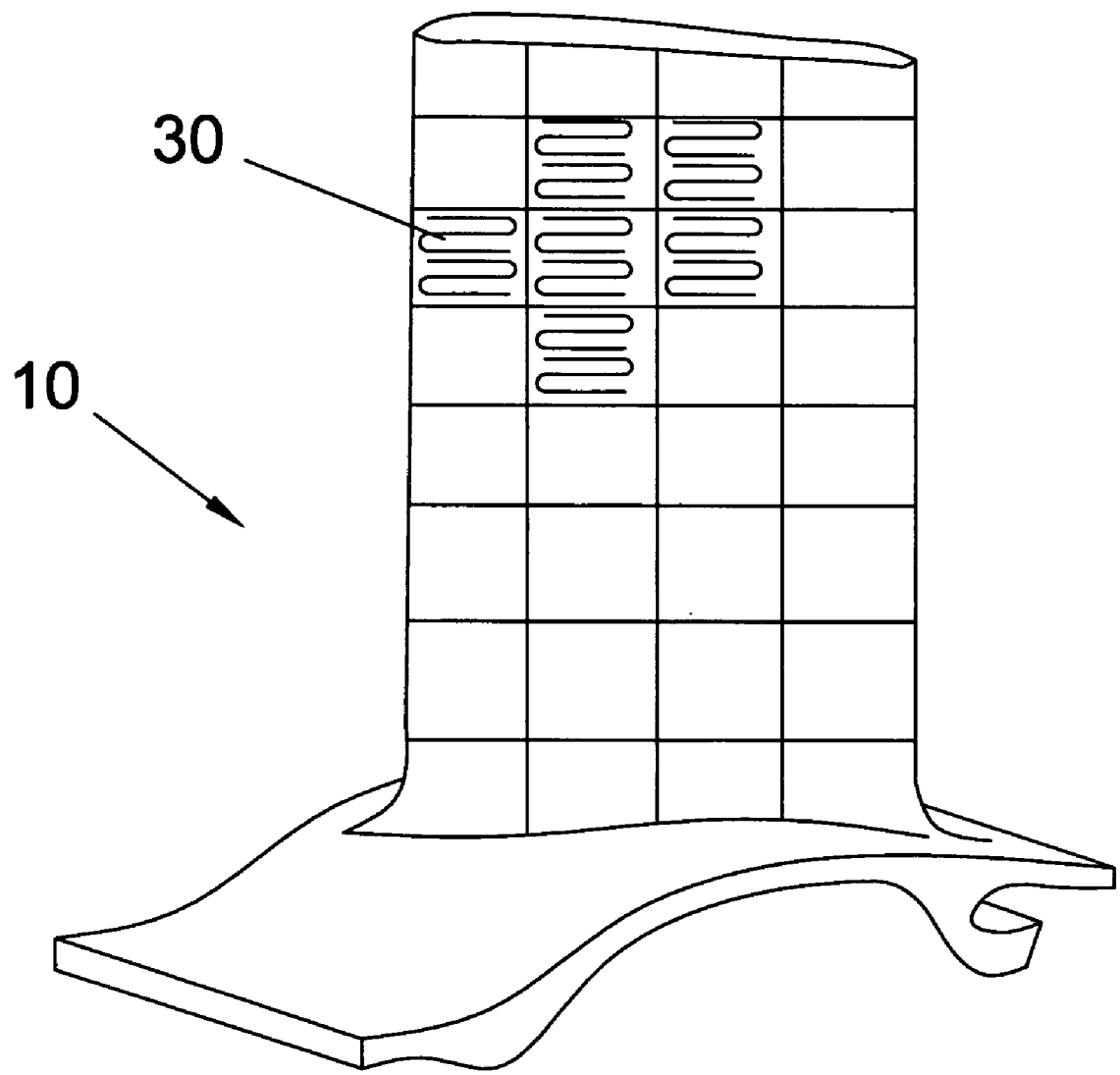
FIG. 5 shows a side view of an airfoil having a plurality of the mini-serpentine modules arranged as blocks on the pressure side of the airfoil.

Each of the mini-serpentine modules 30 are arranged around the airfoil and located between the outer airfoil surface 12 and the inner airfoil wall 14. In the embodiment shown in the present invention, the serpentine flow passages are formed in the internal wall 14 of the airfoil on its outer surface facing the outer airfoil surface 12. Also, the serpentine cooling flow passage flow from bottom to top as represented in FIG. 2. The reason for this is due to centrifugal forces as the rotor blade rotates. The rotation will act to push the cooling air through the serpentine passage 30 is it is arranged to flow from bottom to top as shown in FIG. 2. Also, the flow path for the mini-serpentine passages 30 are along the chord-wise direction of the airfoil, i.e. the cooling air flows substantially along the chord-wise length of the airfoil. In the embodiment shown, three modules are used along the chord-side length of the airfoil pressure side, i.e. three modules are arranged in series from the leading edge to near the trailing edge of the airfoil. The suction side of the airfoil has four modules 30 arranged in series along the chordwise length. Each module is connected to the internal radial cavity adjacent thereto. However, a plurality of modules 30 arranged along the chord-side length can be connected to the same radial cavity in the airfoil if desired. FIG. 5 shows a pressure side of an airfoil 10 having a plurality of the mini-serpentine modules 30 arranged from tip to root and from leading edge to trailing edge. From the leading edge to the trailing edge along the chordwise length of the airfoil are four modules. From the tip to the root of the airfoil are eight modules 30. More or less than shown in FIG. 5 can be used depending upon the design requirements for the airfoil.

The trailing edge of the airfoil is provided with cooling air from the trailing edge radial cooling cavity 20 through a trailing edge rib 15. The trailing edge rib 15 includes a plurality of metering holes 17 to allow for cooling air to flow from the radial cavity 20 and into a trailing edge channel 22. Cooling air from the trailing edge radial cavity 20 flows out from exit hole 33, and then divides into airflow into one of the two mini-serpentine passages 30 on the pressure and suction sides of the airfoil or into the metering hole 17 leading into the trailing edge cooling channel 22. A plurality of trailing edge chord-wise ribs 25 are formed in the trailing edge portion of the airfoil. A flow blocker 24 extends in a radial direction of the airfoil and through the trailing edge channel 22 to direct the cooling air from the metering holes 17 around the flow blocker 24 to cool both the pressure side and suction side of the trailing edge of the airfoil. A plurality of exit cooling holes 19 are located on the extreme trailing edge of the airfoil to discharge the cooling air form the trailing edge channels 22 and out from the airfoil. FIG. 4 shows a cut-away view of the trailing edge cooling flow channels 22 with the blocker 24 and chord-wise ribs 25.

In operation, cooling air is supplied through the airfoil mid-chord (trailing edge) cavity 20 and metered through the cooling feedhole to the chordwise mini-serpentine flow module 30. Cooling air is then passed through the serpentine path through the forward and aftward flowing channels 32, and then discharged onto the airfoil surface to form a film layer for airfoil external film cooling. For the airfoil trailing edge, cooling air is supplied through the airfoil mid-chord cavity 20, channeled around the flow blocker 24, through the near wall cooling channels 22, and then discharged from the trailing edge through cooling holes 19.

The airfoil of the present invention is shown as having a plurality of mini-serpentine modules arranged on the airfoil surfaces in a square pattern having equal length sides. However, the size and shape of the individual modules can vary according to design and cooling requirements. The modules can have various rectangular sizes on the airfoil such that an adjacent module has a longer side length. Also, the modules can be arranged offset from a chordwise length of the airfoil such that a line passing through the centers of adjacent modules would be offset from the rotational axis of the turbine. The mini-serpentine cooling channels of the present invention are large enough to provide adequate airfoil cooling that would be impossible in a large airfoil using the prior art Auxier et al micro-circuit passages. Also, the mini-serpentine cooling channels of the present invention are large enough that they can be formed in a large airfoil with reasonable cost and manufacturing capability which the Auxier et al patent is also incapable of doing for large airfoils.

I claim:

1. An airfoil for a gas turbine engine, the airfoil comprising:
a leading edge and a trailing edge;
a pressure side and a suction side;
an inner wall forming a cooling air supply cavity;
an outer wall forming the airfoil surface;
the pressure side having a plurality of mini-serpentine cooling modules, each module having at least a three-pass serpentine cooling flow passage with an inlet in fluid communication with the cooling air supply cavity and an outlet on the outer wall to provide film cooling to the airfoil surface; and,
the inlet of the mini-serpentine cooling passage is located below the outlet such that centrifugal forces acting on the rotating airfoil force the cooling air through the passage.

2. The airfoil for a gas turbine engine of claim 1, and further comprising:
the serpentine cooling passages of the modules are formed in the outer surface of the inner wall of the airfoil.

3. The airfoil for a gas turbine engine of claim 2, and further comprising:
a flat surface formed on the inner wall surface between adjacent walls of the serpentine passage to form a contact face for the outer airfoil wall.

4. The airfoil for a gas turbine engine of claim 1, and further comprising:
the suction side having a plurality of mini-serpentine cooling modules.

5. The airfoil for a gas turbine engine of claim 1, and further comprising:
the airfoil includes a leading edge cooling air supply cavity;
a central cooling air supply cavity located aft of the leading edge cooling air supply cavity;
a trailing edge cooling supply cavity located aft of the central cooling air supply cavity;
a leading edge pressure side mini-serpentine module and suction side mini-serpentine module, each having an inlet in fluid communication with the leading edge cooling supply cavity;
a central pressure side mini-serpentine module and a trailing edge pressure side mini-serpentine module, each having an inlet in fluid communication with the trailing edge cooling supply cavity; and,
a first central suction side mini-serpentine module and a second central suction side mini-serpentine module, each having an inlet in fluid communication with the central cooling air supply cavity.

6. The airfoil for a gas turbine engine of claim 5, and further comprising:
the trailing edge cooling supply cavity having a metering hole on the aft end of the cavity;
a trailing edge rib located aft of the trailing edge cooling supply cavity and having a metering hole therein;
a trailing edge channel located aft of the trailing edge rib; and,
an exit cooling hole in the aft end of the trailing edge channel; and,
a flow blocker located within the trailing edge channel, wherein cooling air supplied to the trailing edge cooling supply cavity flows out of the metering hole and into the metering hole of the rib and out the exit hole, and also flows into the inlets of the mini-serpentine cooling modules adjacent thereto to supply cooling air to the airfoil surface.

7. The airfoil for a gas turbine engine of claim 1, and further comprising:
the mini-serpentine cooling modules can be all three-pass serpentine passages, or five-pass serpentine passages, or a combination of three-pass and five-pass serpentine passages.

8. The airfoil for a gas turbine engine of claim 1, and further comprising:
the diameter of the passage is about 1 mm.

9. The airfoil for a gas turbine engine of claim 1, and further comprising:
the length of a straight section of the passage is from about 5 mm to about 10 mm.

10. The airfoil for a gas turbine engine of claim 1, and further comprising:
the outer airfoil wall is formed thinner than would be allowable by casting.

11. The airfoil for a gas turbine engine of claim 1, and further comprising:
the airfoil is a large rotor blade for an industrial gas turbine engine.

12. The airfoil for a gas turbine engine of claim 1, and further comprising:
The airfoil is a turbine rotor blade for an industrial gas turbine engine.

13. The airfoil for a gas turbine engine of claim 1, and further comprising:
The serpentine flow channels are formed during casting of the airfoil or from machining after the airfoil has been cast.

14. An airfoil for a gas turbine engine, the airfoil comprising:
a leading edge and a trailing edge;
a pressure side and a suction side;
an inner wall forming a cooling air supply cavity;
an outer wall forming the airfoil surface;
the pressure side having a plurality of mini-serpentine cooling modules, each module having at least a three-pass serpentine cooling flow passage with an inlet in fluid communication with the cooling air supply cavity and an outlet on the outer wall to provide film cooling to the airfoil surface;
a plurality of cooling supply cavities; and,
at least one module arranged along a chordwise length of the airfoil being in fluid communication with each of the plurality of cooling supply cavities.

15. The airfoil for a gas turbine engine of claim 14, and further comprising:
a plurality of rows of mini-serpentine cooling modules arranged along the airfoil pressure side, each module being supplied with cooling air from one of the plurality of cooling cavities.

16. An airfoil for a gas turbine engine, the airfoil comprising:
a leading edge and a trailing edge;
a pressure side and a suction side;
an inner wall forming a cooling air supply cavity;
an outer wall forming the airfoil surface;
the pressure side having a plurality of mini-serpentine cooling modules, each module having at least a three-pass serpentine cooling flow passage with an inlet in fluid communication with the cooling air supply cavity and an outlet on the outer wall to provide film cooling to the airfoil surface;
a trailing edge cooling supply cavity having a metering hole on the aft end of the cavity;

a trailing edge rib located aft of the trailing edge cooling supply cavity and having a metering hole therein;

a trailing edge channel located aft of the trailing edge rib;

an exit cooling hole in the aft end of the trailing edge channel; and, a pressure side mini-serpentine cooling module and a suction side mini-serpentine cooling module each having an inlet in fluid communication with the metering hole of the trailing edge cooling supply cavity, wherein cooling air supplied to the trailing edge cooling supply cavity flows out of the metering hole and into the metering hole of the rib and out the exit hole, and also flows into the inlets of the mini-serpentine cooling modules to supply cooling air to the airfoil surface.

17. An airfoil for a gas turbine engine, the airfoil comprising:

a leading edge and a trailing edge;

a pressure side and a suction side;

an inner wall forming a cooling air supply cavity;

an outer wall forming the airfoil surface;

the pressure side having a plurality of mini-serpentine cooling modules, each module having at least a three-pass serpentine cooling flow passage with an inlet in fluid communication with the cooling air supply cavity and an outlet on the outer wall to provide film cooling to the airfoil surface; and, a flow blocker located within the trailing edge channel to divert the cooling air around the flow blocker and against the pressure side and suction side of the trailing edge of the airfoil.

18. A process for cooling a turbine airfoil, the turbine blade having an inner wall forming a cooling air supply channel and an outer wall forming an airfoil surface, the process comprising the steps of:

supplying cooling air to the supply channel;

passing cooling air from the supply channel into a plurality of mini-serpentine cooling passages formed between the inner wall and the outer wall;

discharging the cooling air from the mini-serpentine passages onto the airfoil surface; and passing the cooling air through the mini-serpentine passages in a direction toward the tip of the airfoil such that centrifugal force acting on the airfoil from rotation will propel the cooling air through the passages.

19. The process for cooling a turbine airfoil of claim 18, and further comprising the step of:

passing the cooling air along the mini-serpentine passages in mostly a chordwise length of the airfoil.

20. A process of forming a turbine airfoil, the turbine airfoil having a leading edge and a trailing edge, and a pressure side and a suction side, the process comprising the steps of:

forming a central cooling air supply passage from an inner wall of the airfoil;

forming a plurality of mini-serpentine cooling air passages on the outer surface of the inner wall of the blade;

forming a cooling air supply hole on one end of each of the mini-serpentine passages;

forming an outer wall over the inner wall to form an airfoil surface;

forming a cooling air discharge hole on the opposite end of each of the mini-serpentine passages to discharge cooling air onto the blade surface; and forming the cooling air supply hole at a location from the airfoil tip below the cooling air discharge hole in the mini-serpentine passage.

21. The process of forming a turbine airfoil of claim 20, and further comprising the step of:

forming the mini-serpentine passages in substantially the chordwise length of the airfoil.

22. The process of forming a turbine airfoil of claim 20, and further comprising the step of:

forming the mini-serpentine passages with a diameter of from about 0.5 mm to about 1.5 mm.

23. The process of forming a turbine airfoil of claim 20, and further comprising the step of:

forming the mini-serpentine passages with a straight section length of from about 5 mm to about 10 mm.

24. The process of forming a turbine airfoil of claim 20, and further comprising the step of:

forming the mini-serpentine passage as a three-pass serpentine passage.

* * * * *